UNITED STATES PATENT OFFICE 2,442,143

SYNTHESIS OF PANTOTHENIC ACID AND ITS SALTS

Frank D. Pickel, Newark, and Harry H. Weinstock, Jr., Belleville, N. J., assignors to Nopco Chemical Company, Harrison, N. J., a corporation of New Jersey No Drawing. Application June 6, 1941, Serial No. 396,868

7 Claims. (Cl. 260—534)

This invention relates in general to a novel process of synthesizing the so-called chick antidermatitis factor, and particularly to the synthesis of pantothenic acid and its salts.

Pantothenic acid has been produced synthetically by a number of different processes, one of which involves the condensation of a suitable lactone such as α-hydroxy ββ dimethyl butyrolactone with an organic ester of β-alanine, the condensation product being subsequently hydrolyzed. This process has been found to be unsuitable for commercial operations in view of the difficulties involved in the production of the β-alanine esters. Moreover, these esters are highly unstable and must be used practically immediately after their preparation, which further detracts from the commercial value of the process. A second process entails the condensation of a salt of β-alanine with a suitable lactone, and particularly that one referred to supra. While this second process is highly superior to the first process from a commercial viewpoint, it also has disadvantages in that the yields are relatively low and that the condensation product is characterized by being hard and glassy. These characteristics of the condensation product render it very difficult to remove the same from the vessel in which it is produced. Still another process involves fusing free β-alanine with the aforementioned lactone. This process is likewise highly impractical in view of the low yield of pantothenic acid.

The general object of the invention is to obviate the foregoing disadvantages in the synthesis of pantothenic acid and its salts.

A specific object of the invention is to provide an efficient and commercially practical process for the synthesis of pantothenic acid and its derivatives.

A further object of the invention is to provide an improved process of condensing a salt of β-alanine with a lactone, whereby a pulverant and noncohesive product is obtained.

Other objects of the invention will in part be obvious and will in part appear hereinafter.

It has now been discovered that the foregoing objects may be accomplished by condensing a salt of β-alanine with α-hydroxy ββ dimethyl butyrolactone or any other suitable lactone in the presence of a substantially anhydrous organic solvent. It has been found that the presence of a substantially anhydrous organic solvent, and particularly absolute ethanol or methanol or a mixture thereof, during the reaction provides exceedingly high yields, as well as a product which is characterized by being pulverant and nonadherent with respect to the sidewalls of the reaction chamber. The condensation product obtained in the process of the invention is a normal salt of pantothenic acid. While the salt may readily be hydrolyzed to the acid, it is not necessary to do so inasmuch as the salt possesses at least an equivalent degree of physiological activity with respect to pantothenic acid itself.

The invention accordingly comprises the several steps and the relation of one or more of such steps with respect to each of the others thereof, which will be exemplified in the process hereinafter disclosed, and the scope of the invention will be indicated in the claims.

In carrying out the process of the invention, it is preferred to commence the synthesis of pantothenic acid or its salts with a suitable salt of β-alanine, which has the following structural formula:

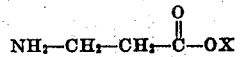

wherein X represents the salt imparting group. Any suitable salt of β-alanine may be used in the condensation step. While any suitable organic salt such as the amino salts of β-alanine may be used, it is preferred to employ a polyvalent metal salt, and particularly the calcium salt. The particular salt of β-alanine to be used should preferably correspond to the particular salt of pantothenic acid desired in the end product. For example, if it is desired to obtain the calcium salt of pantothenic acid, the calcium salt of β-alanine should be employed.

In effecting the condensing step of the process of the invention, a salt of the foregoing type is reacted with a suitable fatty acid of the type which lactonizes spontaneously. As a matter of fact, the condensation is actually effected by the reaction of the salt of β-alanine with the lactone of an α-hydroxy fatty acid containing more than 4 carbon atoms. The lactones to be utilized in the process are those which on condensation with a β-alanine salt yield a product possessing the characteristic physiological activity of pantothenic acid. Examples of such lactones include, among others, α-hydroxy ββ dimethyl butyrolactone, α-hydroxy n-valerolactone and α-hydroxy β methyl butyrolactone, which are derived from ββ dimethyl αγ-dihydroxy butyric acid αγ-dihydroxy valeric acid and β methyl αγ-dihydroxy butyric acid, respectively. While these and other lactones or their respective acids may be condensed with a salt of β-alanine in accordance with the invention to yield products possessing the characteristic physiological activity of pantothenic acid, the use of α-hydroxy ββdimethyl butyrolactone is highly preferred. This latter lactone, which has the following structural formula:

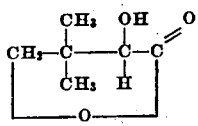

constitutes a portion of pantothenic acid, whereas the other lactones aforementioned will not yield pantothenic acid or salts thereof on condensation with β-alanine or salts thereof, although they will yield products which do possess, to a lesser degree, the physiological activity of pantothenic acid.

The preferred condensation of the invention may be illustrated as follows:

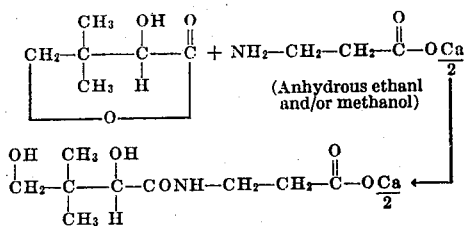

The salient feature of the invention resides in carrying out the condensation of the β-alanine salt with the lactone in the presence of a substantially anhydrous organic solvent. The solvent used must be substantially completely devoid of water, the tolerance being about 1% moisture based on the weight of the solvent used. Any suitable solvent may be used which will permit the condensation to be carried out and which will facilitate the production of a solid pulverant nonadherent condensation product. Suitable solvents include, inter alia, substantially anhydrous solvents (containing not more than 1% moisture) such as methanol, ethanol, n-propanol and isopropanol. While other anhydrous solvents such as butanol, isobutanol, petroleum ether, heptane and the like, may be used, the results obtained by the use of anhydrous alcohols containing 1, 2 or 3 carbon atoms are much superior. The expression "substantially anhydrous" is used herein to denote a solvent containing not more than 1% moisture.

For a fuller understanding of the nature and objects of the invention, reference should be had to the following examples which are given merely to further illustrate the invention and are not to be construed in a limiting sense, all parts given being by weight.

Example I

To 29 parts of the sodium salt of β-alanine suspended in 134 parts of absolute ethanol, there were added 34 parts of d, l α hydroxy ββ dimethyl γ butyrolactone. The reaction was heated under reflux at atmospheric pressure for two hours. The alcohol was then removed under vacuo. A physiological assay on the pulverant residue indicated the sodium pantothenate to be of a high degree of purity.

Example II 100 parts of sodium salt of β-alanine were suspended in 630 parts of absolute isopropanol containing 117 parts of d, l α-hydroxy ββ dimethyl γ butyrolactone and heated under reflux for two hours. After removing the alcohol under vacuo a dry, friable pulverant mass was obtained, which was composed essentially of sodium pantothenate.

Example III

To 701 parts of ββ dimethyl α hydroxy butyrolactone in 2376 parts of boiling absolute methanol there were added 594 parts of sodium βalaninate in three equal portions at half hourly intervals. The reaction mixture was refluxed for two hours more, and then evaporated to dryness on the water bath at 50° C. There was obtained a dry, pulverant material, which upon analysis indicated 88% sodium pantothenate to be present.

Example IV 980 parts of the calcium salt of β-alanine were suspended in a solution of 1155 parts of d, l α-hydroxy ββ dimethyl butyrolactone in 5544 parts of commercial synthetic methanol. The reaction mixture was heated under reflux for two hours, and the solvent removed under vacuo at 40° C. There was obtained a friable product, which was ground to a pulverulent material. A physiological assay indicated the product was substantially pure d, l, calcium pantothenate.

Example V 976 parts of calcium salt of β-alanine were suspended in a solution of 1185 parts of l α hydroxy ββ dimethyl butyrolactone in 4752 parts of anhydrous methanol. The methanol had been dried by refluxing over magnesium and distilling. The reaction mixture was heated under reflux for two hours, after which the solvent was removed under vacuo at 45° C. A very dry, glistening, friable product was obtained, which was readily broken up into a pulverulent form.

Example VI 1340 parts of l α hydroxy ββ dimethyl butyrolactone were dissolved in 6370 parts of anhydrous methanol and to this solution there were added 370 parts of calcium β alaninate, and the mixture refluxed for 40 minutes. A second batch of 370 parts of calcium β alaninate was added to the aforementioned mass and the mixture refluxed for 40 minutes. A third batch of 370 parts of calcium β alaninate was added to the reaction mass, which was then refluxed for another 40 minutes. The reaction mass was allowed to stand over night at room temperature, whereupon a fair amount of long needles of calcium pantothenate had crystallized out. The methanol was removed by vacuum distillation at 45° C. The resulting crystal-containing pulverant product was assayed and found to be 94% active.

The process of the invention has been found to be commercially practical in view of the high yields obtained. Moreover, the physical nature of the salts of pantothenic acid as produced by the foregoing process is of great value. The use of the calcium salt of β-alanine is particularly efficacious in view of the fact that a product containing crystalline calcium pantothenate is obtained. This product may be readily recrystallized to give pure crystalline calcium pantothenate, the original crystals serving as seeds in the recrystallizing step. It has been found that better yields may be obtained if the salt of β-alanine is added to the lactone gradually or in increments spaced by refluxing periods. The expression "normal salt of pantothenic acid" is used herein to connote the ordinary monovalent salts of pantothenic acid and the complete polyvalent metal salts of pantothenic acid, i. e., in the latter case there is present in the salt one pantothenic acid residue for each valence of the metal in the salt, thus, normal calcium pantothenate has the following structural formula:

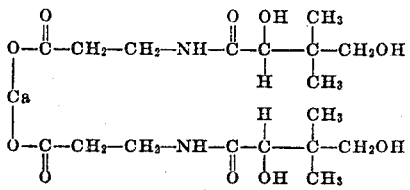

Having described our invention, what we claim as new and desire to secure by Letters Patent is:

1. In the process of synthesizing a normal salt of pantothenic acid, the step which comprises condensing a polyvalent metal salt of β-alanine with α-hydroxy ββ dimethyl butyrolactone in the presence of a substantially anhydrous alcohol containing 1 to 3 carbon atoms.

2. In a process of synthesizing normal calcium pantothenate, the step which comprises condensing calcium β-alaninate with α-hydroxy ββ dimethyl butyrolactone in the presence of a substantially anhydrous alcohol containing 1 to 3 carbon atoms.

3. In a process of synthesizing normal calcium pantothenate, the step which comprises condensing calcium β-alaninate with α-hydroxy ββ dimethyl butyrolactone in the presence of substantially anhydrous methanol.

4. In a process of synthesizing normal calcium pantothenate, the step which comprises condensing calcium β-alaninate with α-hydroxy ββ dimethyl butyrolactone in the presence of substantially anhydrous ethanol.

5. A process of synthesizing normal calcium pantothenate, which comprises condensing calcium β-alaninate with α-hydroxy ββ dimethyl butyrolactone by refluxing the same in the presence of a substantially anhydrous alcohol containing 1 to 3 carbon atoms.

6. A process of synthesizing normal calcium pantothenate, which comprises condensing calcium β-alaninate with α-hydroxy ββ dimethyl butyrolactone by refluxing the same in the presence of substantially anhydrous methanol.

7. A process of synthesizing normal calcium pantothenate, which comprises condensing calcium β-alaninate with α-hydroxy ββ dimethyl butyrolactone by refluxing the same in the presence of substantially anhydrous ethanol.

FRANK D. PICKEL.
HARRY H. WEINSTOCK, Jr.

REFERENCES CITED

The following references are of record in the file of this patent:

UNITED STATES PATENTS

| Number | Name | Date |
|---|---|---|
| 2,234,680 | Moore | Mar. 11, 1941 |

OTHER REFERENCES

Williams et al., J. Am. Chem. Soc., vol. 62 (July 1940), pages 1782–1783.

Williams et al., J. Am. Chem. Soc., vol. 60 (1938), pages 2719–2722.

Snell et al., J. of Bacteriology, vol. 38 (1939), pages 297–299.

Gatzi-Fichter et al., Helv. Chim. Acta, vol. 24, page 187.

Grussner et al., Helv. Chim. Acta., vol. 23, page 1285.

Reichstein et al., Helv. Chim. Acta, vol. 23, pages 651, 657.

Wijk, Rec. des. trav. Chim. des Pay-Bas, vol. 40, page 226 (1921).

Williams et al., J. Am. Chem. Soc., vol. 62, pages 1784–1790.

Babcock et al., J. Am. Chem. Soc., vol. 62, page 1628.